United States Patent [19]
Roussakis et al.

[11] Patent Number: 5,415,233
[45] Date of Patent: May 16, 1995

[54] FLAME ARRESTOR APPARATUS

[75] Inventors: Nicholas Roussakis, Toronto; Dwight E. Brooker, Meadow Creek, both of Canada

[73] Assignee: Chem-Mech, Alberta, Canada

[21] Appl. No.: 196,804

[22] Filed: Feb. 15, 1994

Related U.S. Application Data

[63] Continuation of Ser. No. 105,651, Aug. 13, 1993, abandoned, which is a continuation of Ser. No. 906,315, Jun. 30, 1992, abandoned.

[51] Int. Cl.⁶ ............................................. A62C 4/00
[52] U.S. Cl. ..................................... 169/48; 48/192; 431/346
[58] Field of Search .................... 48/192; 60/39.11; 138/41, 42; 169/48, 54; 239/590, 590.3, 590.5; 431/22, 346

[56] References Cited

U.S. PATENT DOCUMENTS

| | | | |
|---|---|---|---|
| 802,380 | 10/1905 | Emerson et al. | 431/346 |
| 1,681,698 | 8/1928 | Brooks | 48/192 |
| 1,701,805 | 2/1929 | Dunn et al. | 48/192 |
| 1,735,261 | 11/1929 | Calhoun | 48/192 |
| 1,783,701 | 12/1930 | Cooke et al. | 48/192 |
| 1,826,487 | 10/1931 | Wiggins | 48/192 |
| 1,839,655 | 1/1932 | Dobbins | 48/192 |
| 1,960,043 | 5/1934 | Anschicks | 48/192 |
| 2,044,537 | 6/1936 | Dunin-Markiewicz et al. | 48/192 |
| 2,068,421 | 1/1937 | Long et al. | 220/88.2 |
| 2,087,170 | 7/1937 | Stephenson | 48/192 |
| 2,186,752 | 1/1940 | Connell | 48/192 |
| 2,277,294 | 3/1942 | Brooks | 48/192 |
| 2,333,567 | 11/1943 | Helmore | 48/192 X |
| 2,420,599 | 5/1947 | Jurs | 48/192 |
| 2,618,539 | 11/1952 | Contra et al. | 48/189.4 |
| 2,758,018 | 8/1956 | Lisciani | 48/192 |
| 2,789,238 | 4/1957 | Staak | 310/88 |
| 3,287,094 | 11/1966 | Brownell | 48/192 |
| 3,356,256 | 12/1967 | Szego | 220/88.1 |
| 3,748,111 | 7/1973 | Klose | 48/192 |
| 3,903,646 | 9/1975 | Norton | 48/192 |
| 3,981,356 | 9/1976 | Granetzke | 138/42 X |
| 4,013,190 | 3/1977 | Wiggins et al. | 220/501 |
| 4,093,818 | 6/1978 | Thwaites et al. | 169/48 X |
| 4,248,342 | 2/1981 | King et al. | 206/3 |
| 4,909,730 | 3/1990 | Roussakis et al. | 138/42 X |
| 4,925,053 | 5/1990 | Fenton et al. | 220/88.1 |
| 5,000,336 | 3/1991 | Gass | 220/88.1 |

FOREIGN PATENT DOCUMENTS

| | | | |
|---|---|---|---|
| 565942 | 11/1958 | Canada. | |
| 666952 | 7/1963 | Canada. | |
| 709337 | 5/1965 | Canada. | |
| 1057187 | 6/1979 | Canada. | |
| 547692 | 12/1922 | France | 48/192 |
| 457425 | 2/1924 | France. | |
| 1123635 | 2/1962 | Germany | 48/192 |
| 1203686 | 10/1965 | Germany. | |
| 2225552 | 11/1973 | Germany | 48/192 |
| 2436206 | 8/1977 | Germany. | |
| 53253 | 10/1921 | Sweden | 48/192 |
| 344806 | 6/1930 | United Kingdom | 48/192 |
| 368680 | 8/1930 | United Kingdom | 431/346 |
| 1047091 | 11/1966 | United Kingdom | 431/346 |
| 1500913 | 2/1978 | United Kingdom | 169/48 |
| 379271 | 7/1973 | U.S.S.R. | 169/48 |
| 1260007 | 9/1986 | U.S.S.R. | 169/48 |

*Primary Examiner*—David M. Mitchell
*Assistant Examiner*—Andrew C. Pike
*Attorney, Agent, or Firm*—Staas & Halsey

[57] ABSTRACT

An apparatus for extinguishing a deflagration or detonation flame travelling along a pipe includes a housing with an inlet and an outlet and couplings for connecting the inlet and outlet to the pipe. A flame extinguishing device is secured in the housing and has a plurality of serially arranged elements, each element having a plurality of longitudinally extending channels. A turbulence device is positioned between adjacent elements and has surfaces for inducing turbulence in the flame flow through the element. The housing seals the elements in a manner to direct flame flow solely through the elements and the turbulence inducing devices.

12 Claims, 4 Drawing Sheets

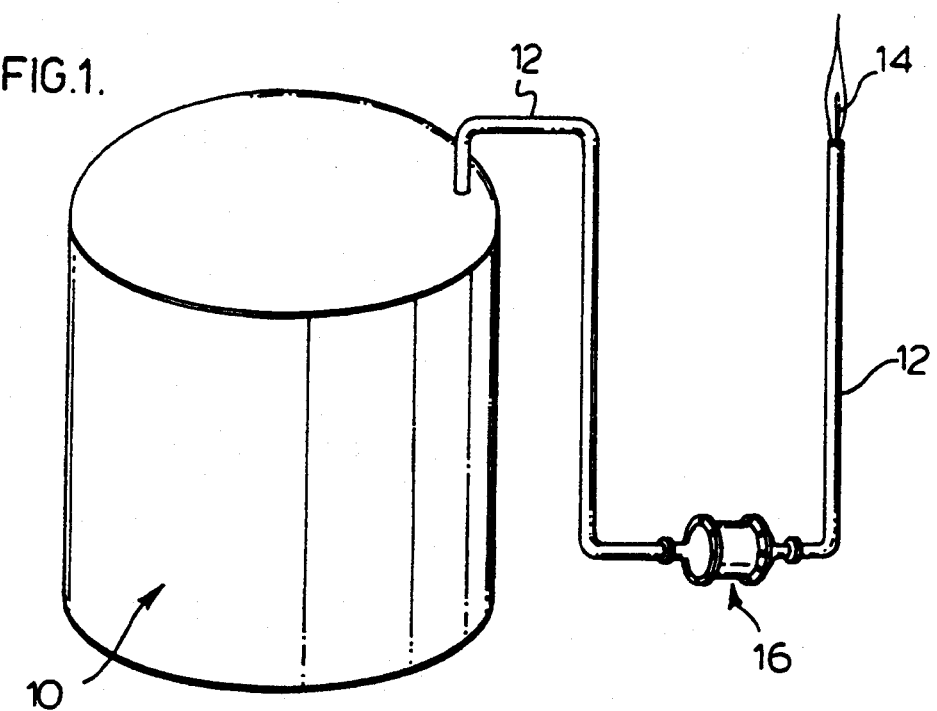
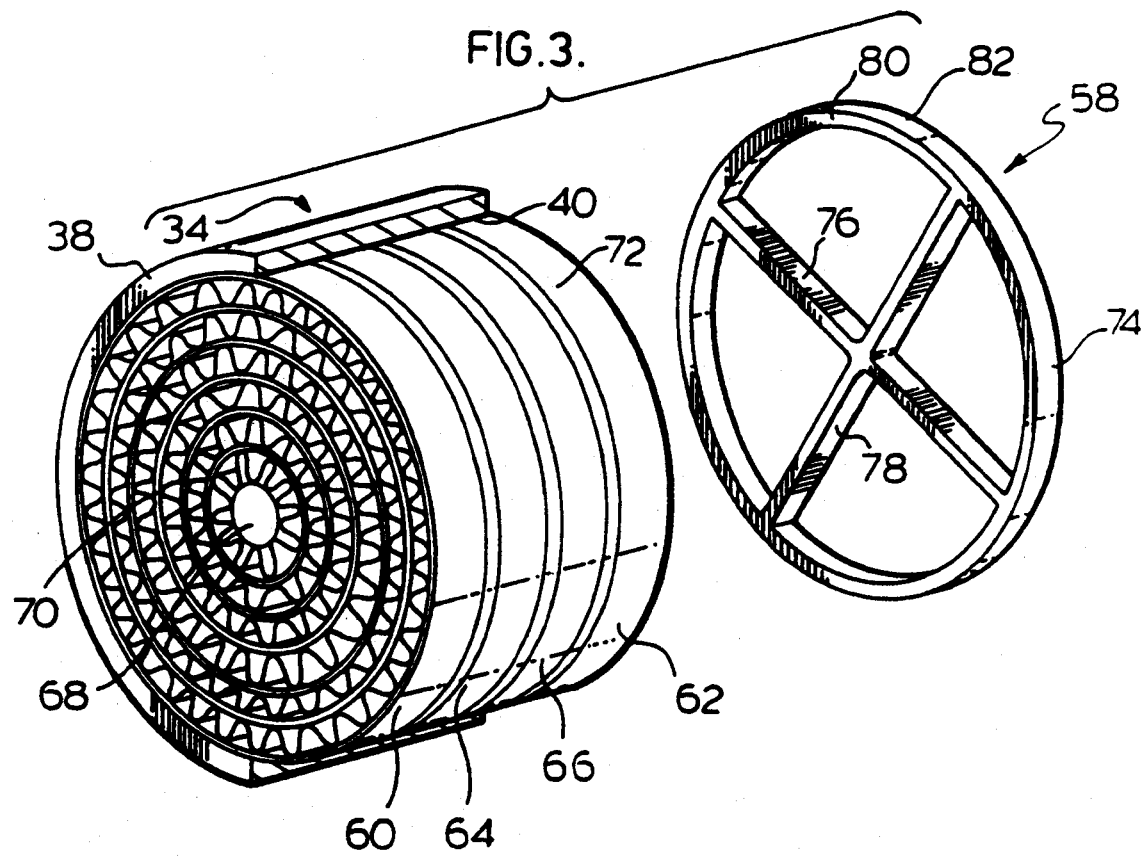

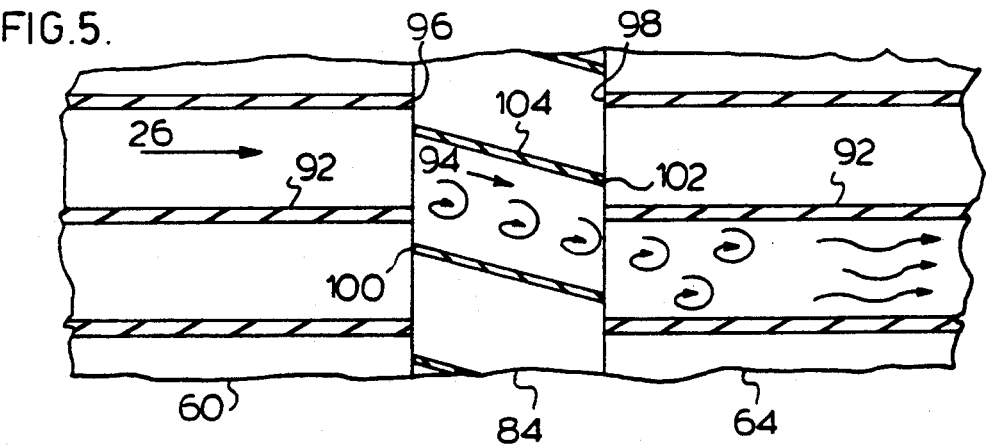
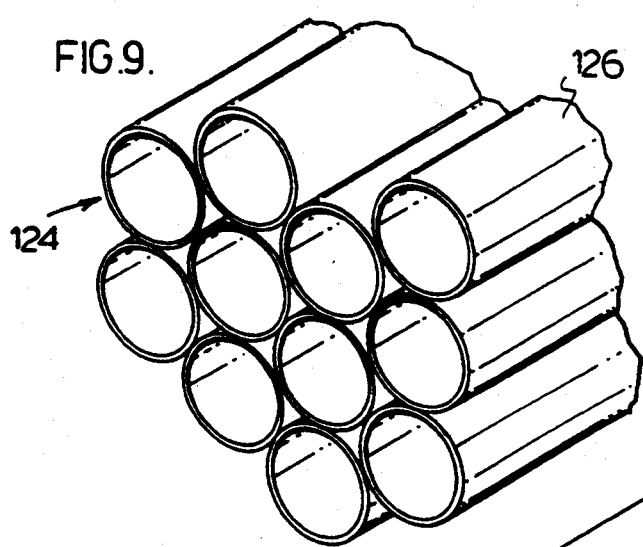
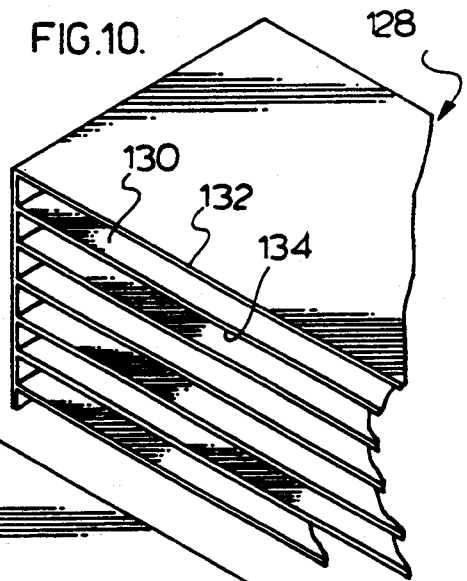
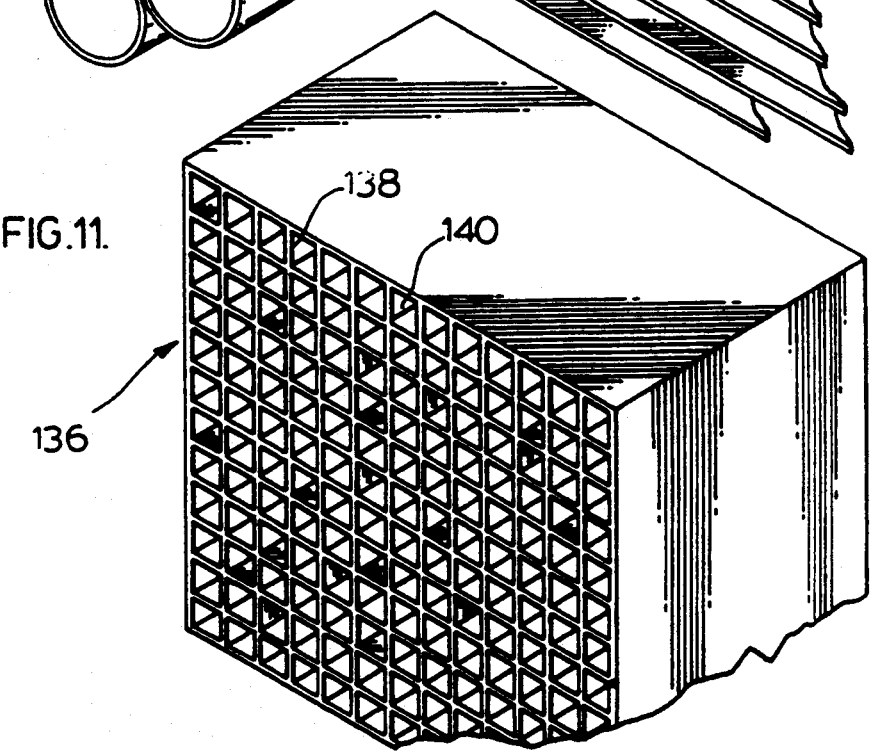

FLAME ARRESTOR APPARATUS

This application is a continuation of U.S. patent application Ser. No. 08/105,651, filed Aug. 13, 1993, now abandoned, which is a continuation of U.S. patent application Ser. No. 07/906,315, filed Jun. 30, 1992, now abandoned.

FIELD OF THE INVENTION

This invention relates to flame arrestor apparatus particularly useful for extinguishing any type of travelling deflagration flame or detonation flame.

BACKGROUND OF THE INVENTION

A flame arrestor apparatus usually comprises flame extinguishing elements which have very small diameter, typically less than 0.040-inch diameter channels that permit gas flow but prevent flame transmission by quenching or extinguishing combustion. This results from the transfer of heat (enthalpy) from the flame (high temperature) to the solid matrix of channels (low temperature) which effectively provide a substantial heat sink.

The quenching process is based on the drastic temperature difference between the flame and channel matrix material. As such, this is a transport process that not only depends on the temperature gradient, but also on the channel hydraulic diameter and the thermal conduction (diffusivity) properties of the gas.

The rate of heat loss from the flame is significantly affected by the level of turbulence within the flame arrestor channel. The turbulence is associated with the flow of unburnt gas through the flame arrestor as instigated by the pressure rise that accompanies a flame front to the element. The flame induced flow is always in the same direction as the impinging flame travel. The pressure rise can range from a small fraction to more than 100 times the initial (pre-ignition) absolute pressure in the system.

Two of the most common types of flame arrestor elements are the crimped ribbon type such as described in U.S. Pat. No. 4,909,730 and the parallel plate type as described in Canadian patent 1,057,187. The major advantage of these constructions is that it is possible to build a device with a fairly large percentage of open flow area per unit cross section while maintaining precise channel dimensions. This is very important because flame arrestors are often used in installations where large volumes of gas must be vented with minimal back pressure on the system. It is generally understood that even small deviations in channel dimensions can compromise flame arrestor performance. These can be referred to as straight path flame arrestors because the gas flow takes a straight path from the channel entrance to the exit.

A major disadvantage of the straight path units is that they do not extract heat from the flame very efficiently. One method commonly used by designers to overcome the low heat transfer efficiency of straight path units is to further reduce the hydraulic diameter of the straight path channels. This is intended to increase heat transfer efficiency by increasing the lateral area of heat loss per unit volume of flame front. However, the diameter reduction further increases the tendency for laminar flow which in turn further reduces heat transfer. The channels of reduced diameter also become clogged and fouled by liquids or particles that are usually present in the system.

Another method frequently used to overcome the low heat transfer efficiency of straight channels is to design an element consisting entirely of tortuous path channels. Examples of these include stacked expanded metal or wire mesh, sintered metal or ceramic, packed beads, and steel wood plug. The disadvantages of tortuous path elements is that they clog readily, are difficult to clean, and they have unacceptably high flow pressure drops, resulting in the need for excessively large element flow cross sections.

There are several examples of these types of systems, as given in prior patents. Examples of wire mesh systems are described in U.S. Pat. No. 1,701,805 and Canadian patent 666,952. The wire mesh element comprises a plurality of layers which function as a flame flow interrupter. Other systems which develop tortuous paths for the gas flow are described in Canadian patents 565,942 and 709,337. Such tortuous paths are provided by beads, particles, and the like which are also used in a system described in U.S. Pat. No. 2,044,573.

A system which involves crimped ribbon and laminar flow channels for the flame arrestor element are described in U.S. Pat. Nos. 2,087,170; 2,789,238; and 3,287,094.

Other types of systems involve nesting of plates, such as described in U.S. Pat. Nos. 1,826,487; 1,960,043; 2,068,421; 2,186,752; 2,618,539; 2,758,018; and 3,903,646. In these flame arrestors the plates are nested in a manner to provide flame extinguishing properties by transfer of heat from the flame front to the flame arrestor element.

As noted, the difficulty with these flame arrestor systems is that the channels through which the flame front flows cause a laminar flow in the flame front. This is detrimental from the standpoint of arresting high pressure flames, particularly detonations. It has been found however that in order to ensure extinction of the detonation type of flame, additional modifications must be made to the arrestor having a wire mesh plate or crimped metal design. In U.S. Pat. No. 4,909,730 a detonation attenuating device is positioned upstream of the flame quenching elements. Testing has demonstrated that the presence of the cup-shaped detonation attenuating device to attenuate impinging shock waves due to detonation significantly improves the overall performance of the flame arrestor having the standard type of crimped metal heat transfer flame arresting elements. However, the use of the detonation attenuator cup causes significant flow restrictions in the gas exhausting system and complicates manufacture of the device.

Although systems have been provided which can arrest flame fronts of the deflagration or detonation type, such systems require the use of element designs which develop significant back pressure. Designs which enhance heat transfer of the flame front to the arresting element have the overriding flow limiting factor of small diameter channels which induce laminar flow, and hence reduce the effectiveness of heat transfer from the flame front to the elements due to the boundary layer effect of the laminar flow through the small diameter channels of the element. There therefore continues to be a need for a flame arresting device which can extinguish all types of travelling flames ranging from deflagration types through to the very high pressure detonation types without overly restricting normal gas flows through the arrestor.

SUMMARY OF THE INVENTION

The apparatus according to this invention incorporates special elements which enable normal designs for arrestor elements to extinguish or quench the various types of travelling flames ranging from low pressure deflagration flames through to high pressure detonation flames.

According to an aspect of the invention, an apparatus is provided for extinguishing a flame travelling along a pipe where the travelling flame is characterized as any type of deflagration flame or detonation flame. The apparatus comprises:

i) a housing with an inlet and an outlet and means for connecting the inlet and the outlet in a pipe, ii) a flame extinguishing device, iii) means for securing the device in the housing, iv) the device including a plurality of serially arranged elements, each element having a plurality of longitudinally extending channels, v) means for inducing turbulence in flow of flame through the elements, the turbulence inducing means being positioned between adjacent elements and having surfaces for inducing turbulent flow in flame exiting an upstream element and before entering a downstream element to enhance thereby heat transfer from a travelling flame into the elements, vi) the device having a sufficient number of elements to extinguish any type of flame travelling along a pipe in which the apparatus is connected, and vii) means for sealing the elements to the housing to direct flame flow solely through the elements and the turbulence inducing means.

BRIEF DESCRIPTION OF THE DRAWINGS

Preferred embodiments of the invention are shown in the drawings, wherein

FIG. 1 schematically shows a flame arrestor within a vent pipe for an oil tank,

FIG. 3, which accompanies FIG. 1, shows the stacked elements in accordance with the preferred embodiment of this invention, FIG. 4, which accompanies FIG. 2, is an exploded view of the turbulence inducing device positioned between two flame arrestor elements, FIG. 5 is a view of adjacent elements with the turbulence inducing device positioned therebetween, FIG. 5, are enlarged views of alternative forms of flame arresting elements.

DETAILED DESCRIPTIONS OF THE PREFERRED EMBODIMENTS

Figure 2:
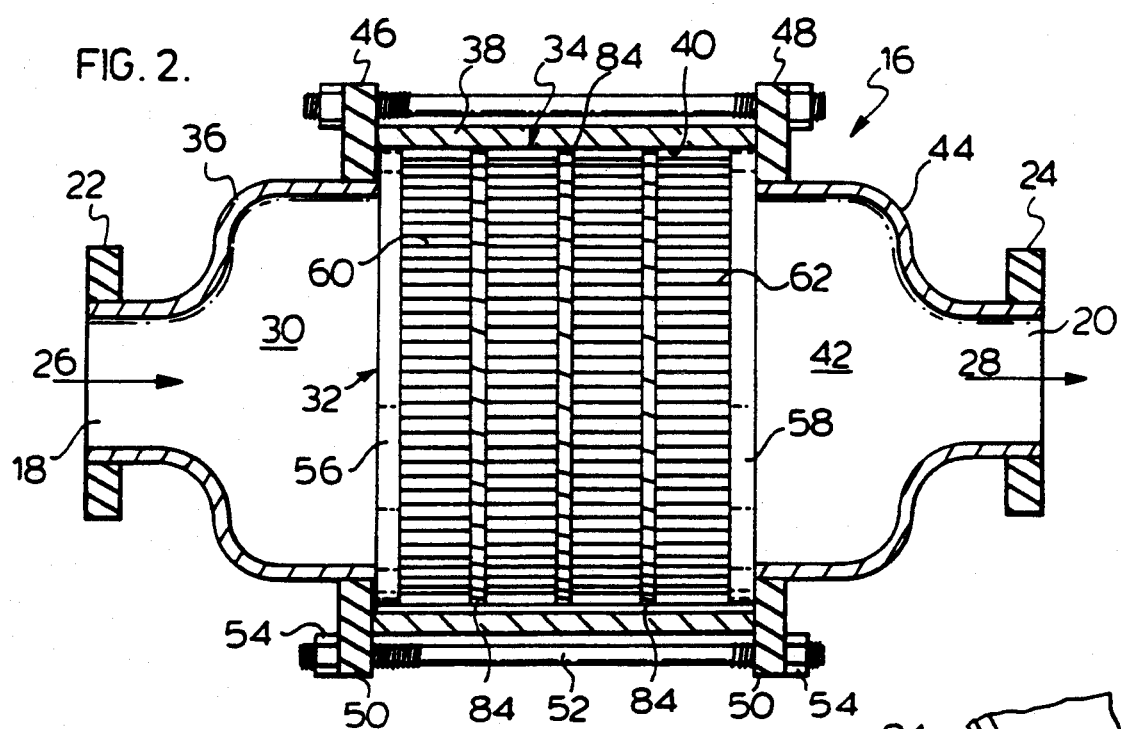
FIG. 2 is a section through the flame arrestor of FIG. 1.

It is appreciated that flame arrestors or, in more general terms, apparatus for extinguishing or quenching flames, are used in a variety of applications, such as demonstrated in the discussion of prior art systems. It is therefore intended that FIG. 1 represent one of the uses of the flame arrestor of this invention. A storage tank 10 for the flammable liquid which produce flammable gases has a vent pipe 12. In the normal manner, the vent pipe 12 has a flare 14 for burning off the gases. The common problem with this arrangement is that the flare 14 may develop a flame front which flows back through the pipe 12 into the tank 10 causing an explosion within the tank. The purpose of the flame arrestor 16 is to prevent travel of that flame front through the pipe 12 and into the tank. As shown in more detail in FIG. 2, the flame arrestor 16 has an inlet 18 and an outlet 20. The inlet has a coupling flange 22 and as well the outlet has a coupling flange 24 to facilitate in the normal manner coupling of the flame arrestor to the pipe in which flames are to be arrested. It is apparent however from the section of FIG. 2 and from the following discussion of various embodiments of the invention that the flame arrestor is bi-directionalso that the inlets and outlets for the arrestor can be reversed. However, in order to facilitate discussion of the unit, the inlets and outlets will be referred to on the basis of it having been positioned in a pipe to define the direction of flow being that of arrows of 26 and 28.

On the inlet side of the flame arrestor is a chamber 30 which has a cross-sectional area approximating the entrance 32 to the flame arresting device, generally designated 34. The inlet chamber 30 is defined by a diverging cowling 36 which is of sufficient structural strength to resist failure in the event of the very high pressure detonation flame fronts. The flame extinguishing device 34 is housed in a cylindrical sleeve 38. The cylindrical sleeve 38 has an inner surface 40 which abuts the periphery of the flame extinguishing elements to act as a seal relative to the inlet chamber 30 thereby ensuring that all gases flowing through the inlet flow solely through the flame arresting device 34. The outlet 20 has an outlet chamber 42 which reduces to the size of the outlet 20. The outlet chamber 42 is defined by a cowling 44 which is also of a material to resist the pressures of detonation flame fronts. Both the inlet and outlet cowlings 36 and 44 are provided with collars 46 and 48. The collars 46 and 48 include apertures 50 through which threaded rod 52 extends and is secured by bolts 54. This clamps the sleeve 38 in position to retain and secure the flame arresting device 34 in place, to ensure that the flame arresting device 34 is not crushed between the inlet and outlet cowlings and to also ensure that the elements are retained in position. Element supports 56 and 58 at the inlet and the outlet are provided to prevent element blow out by advancing high pressure flame fronts. The supports are sandwiched or wedged between the inlet and outlet element components 60 and 62 and the respective collars 46 and 48.

The flame extinguishing device 34 according to this particular embodiment comprises two individual extinguishing elements 60 and 62 at the respective end portions for the device and intermediate elements 64 and 66. It is appreciated however, that depending on performance criteria, there could be as few as two elements or more than 3 or 4 elements. Each element comprises a crimped ribbon metal foil of approximately 0.01 inches in thickness. The crimped metal ribbon is wrapped about a solid mandrel 68. The crimped metal portions, as shown in FIG. 3, may be annular elements 70 layered one upon the other or may be spirally wound about the mandrel 68. Further details of the crimped metal element are described with respect to the enlarged view of FIG. 4. As shown in FIG. 3, the outer circumferential portions 72 of the elements are contacted and encased by the inner surface 40 of the arrestor sleeve 38. As is illustrated, the turbulence inducing or aerodynamic disturbing devices 84 have a thickness considerably less than the longitudinal length of each element. The devices are normally less than 10% of each element length and preferably have a thickness in the range of the hydraulic diameter of the element channels. Also, as shown in FIG. 3, the element support 58 is a ring 74 having an inner grid defined by cross members 76 and 78. The inner face 80 of the support member abuts the outer edge of the respective element 62 in the manner shown in FIG. 2. Its outer periphery 82 is positioned within the sleeve 38 which houses the elements to provide a self-contained cartridge. This self-contained feature for the flame arrestor element provides for ready repair and replacement of the flame arrestor element. The threaded rods are removed which permit dropping from the flame arrestor, the sleeve 38 along with the contained elements. The unit can be simply replaced or the elements knocked out from the sleeve and a new elements inserted. As will be discussed with respect to the remaining drawings, the design of this system facilitates the use of larger channels in the flame extinguishing elements so that the need to remove or disassemble the flame arrestor to allow cleaning thereof is significantly reduced.

Figure 4:
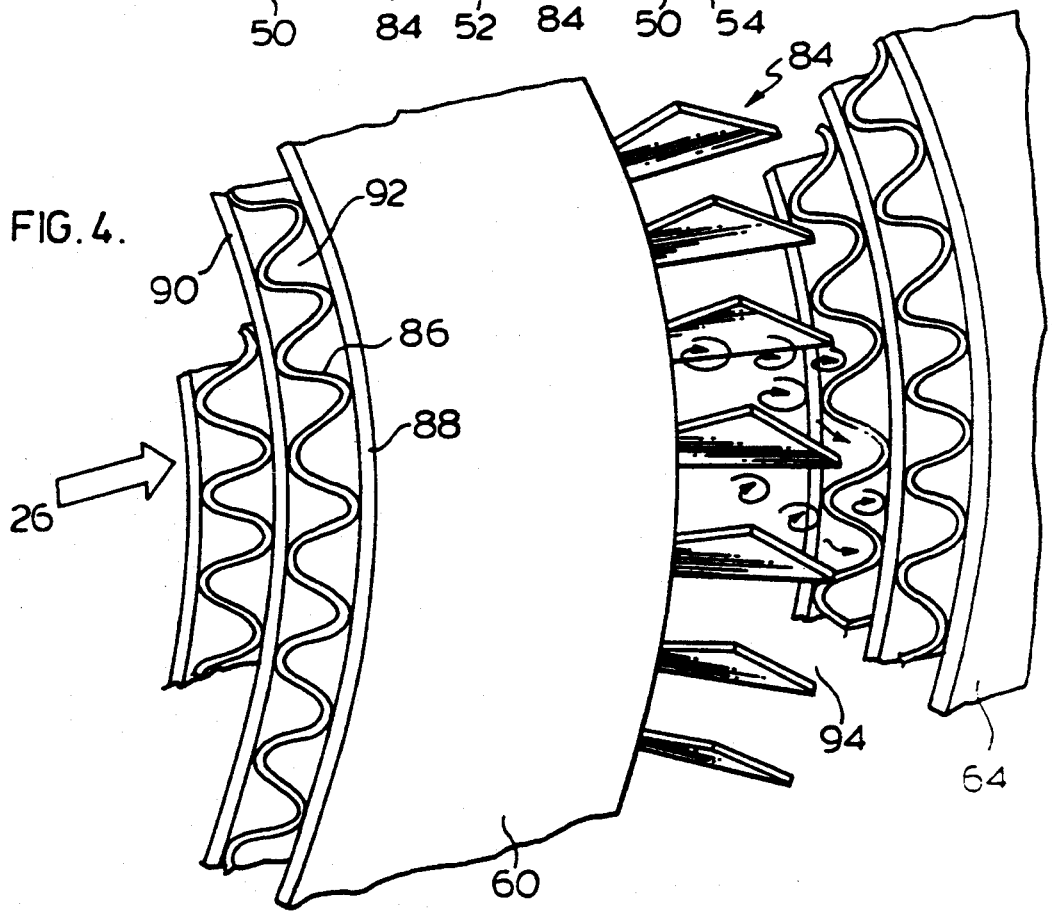

As shown in FIG. 4, the distinguishing aspect of this invention over the prior devices is the use of the turbulence inducing devices positioned between the elements 60, 62, 64, and 66. The turbulence inducing device 84 comprises a plurality of surfaces which redirect or interrupt the flow of the flame front from an upstream element 60 into a downstream element 64 in the direction of flow 26. The element 60 has a plurality of channels defined by the crimped metal ribbon 86 as located between wraps 88 and 90. These channels which extend in the longitudinal direction parallel to arrow 26 effect the transfer of heat from the flame front into the elements which are made of a heat conductive metal such as copper, aluminum, stainless steel, steel alloys, and the like. The channels 92 are of a hydraulic diameter which effect a sufficient redistribution of flow to optimize the heat transfer from the advancing flame front to the elements by providing maximum possible surface area without overly restricting flow or increasing back pressure at high flow rates. In accordance with standard techniques, the hydraulic diameter for the channels 92 is proportional to the cross-sectional area of the channel divided by the total wetted perimeter of the channel. The specific formula for a defined channel is understood to be $$\text{channel hydraulic diameter} = \frac{4 \times \text{cross section area of channel}}{\text{total wetted perimeter of channel}}$$

The channels 92 are of a length which normally causes laminar flow to result in the flame front as it flows through the length of the channel. The turbulence inducing devices 84 by redirecting or interrupting the flow of the travelling flame front cause turbulence, as indicated by eddy currents 94 to be induced in the flame front before entering the next element 64. In this way the boundary layer thickness of the laminar flowing flame front as its exits element 60 is broken up or at least drastically reduced before entering the next element to enhance significantly the heat transfer capabilities of the elements and promote flame extinction. Quite surprisingly, it has been found that by the use of these turbulence inducing elements it is not necessary to provide, in combination with the crimped metal elements, any other device to handle flame extinction caused by detonation flame fronts. As will be demonstrated in the following tests, the turbulence inducing devices provide significant superior results compared to prior art devices, and in particular, devices having crimped metal flame extinguishing elements.

With reference to FIG. 5 the positioning of the turbulence inducing element 84 is shown. Preferably, the element 84 is of sufficient strength so that it may be wedged between the downstream edge portion 96 of element 60 and the upstream edge portion 98 of the downstream element 64. The turbulence inducing device 84 has effectively opposite edge portions 100 and 102 which contact edges 96 and 98 to locate the device 84 and position it and at the same time space the elements 60 and 64 apart. The element 84 has a plurality of sloped vanes 104 which obstruct the flow of gases in the direction of arrow 26 through channel 92 of element 62 into channel 92 of element 64. As already exemplified with respect to FIG. 4, such positioning of the vanes 104 causes eddy currents 94 to develop so that flow into channel 92 continues to be in a turbulent manner with some flow straightening as the gases approach the downstream side of the channel 92 of the downstream element 64.

Figure 6:
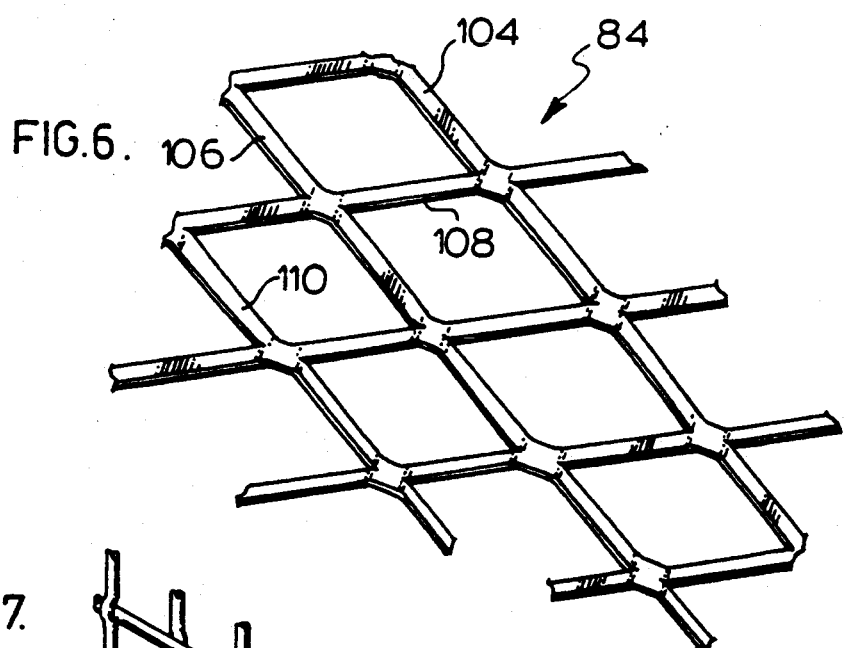
FIGS. 6, 7, and 8 are enlarged views of various types of turbulence inducing devices, and FIGS. 9, 10, and 11, which accompany

The turbulence inducing device 84, having the sloping vanes 104, may be constructed in a variety of shapes and manners. For example, expanded metal is a preferred way of producing the turbulence inducing device 84 as shown in FIG. 6. Expanded metal comprises crisscrossing elements 106 and 108. The expanded metal is formed by piercing metal sheet to form parallel offset cuts and then drawing the metal apart to form the triangular-shaped openings 110. In the process of drawing the metal sheet apart the crisscross members 106 and 108 can be sloped in the manner shown in FIG. 5 to provide the sloping vane surfaces 104.

Figure 7:
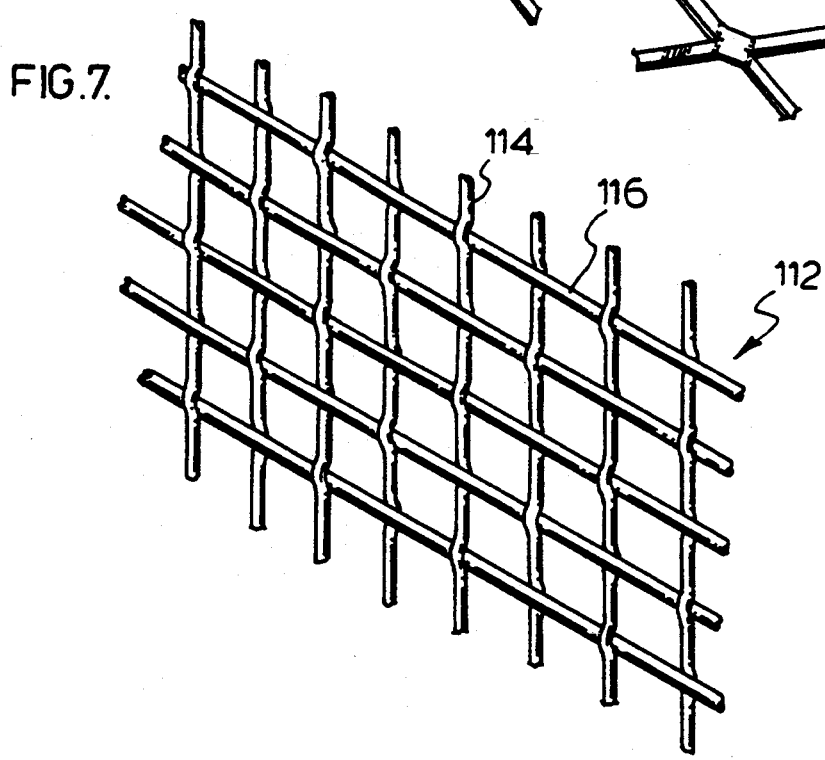

In view of the principal of the invention demonstrated with respect to FIGS. 4 and 5, it is appreciated that other types of turbulent inducing devices may be positioned between the upstream and downstream elements. Such alternative embodiments for the elements may be in the form of the devices of FIGS. 7 and 8. In FIG. 7 a wire mesh 112 is provided having crisscross wires 114 and 116. The positioning of the wire mesh and its sizing is such as to obstruct the flow of the flame front from the upstream element to the downstream element so that in accordance with the action provided by the element 84 of FIG. 5 turbulence is induced in the flame front before entering the channels 92 of the downstream element. Similarly, with FIG. 8, a perforated plate 118 is provided having perforations 120 formed therein. The crisscross nature of the plate 122 interrupts the flow of gases from one element to the next so that in accord with the principal discussed with respect to FIGS. 4 and 5 turbulence is induced in the flame front before entry into the channels of the downstream flame arresting element.

Figure 8:
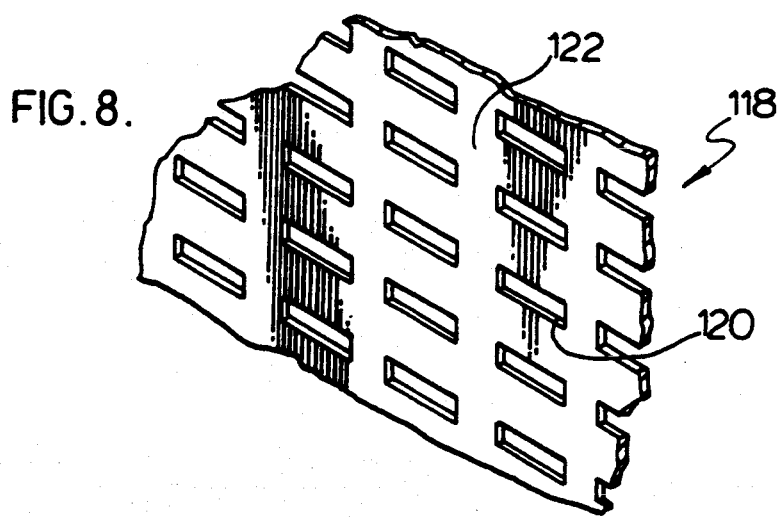

It is appreciated that the sizing of the particular embodiments shown in FIGS. 6, 7, and 8 is chosen to ensure that maximum interruption in the flow pattern of the flame front from one element to the next is provided without significantly reducing flow rate or significantly increasing back pressure.

It is appreciated that the flame extinguishing elements of FIG. 3 may have differing designs such as those shown in FIGS. 9, 10, and 11. In FIG. 9 a tube bundle 124 is provided which comprises individual tubes 126 having the necessary hydraulic diameters to effect flame extinction. Similarly, with the parallel plate device 128 of FIG. 10, the hydraulic diameter defined by the spacing 130 between plates 132 and 134 is such as to effect the flame extinction. The grid system 136 of FIG. 11 comprises normally, intersecting fins 138 which define the channels 140 extending through the element 136. It is understood that these designs may be made of materials other than metal, such as, plastic, ceramic, glass, and the like. It is understood that the time to extinguish the flame is usually less than one second. During this relatively short interval, the elements do not heat up to a temperature which can cause damage to them. This mass of the elements and their relative very low temperature prevents overheating of the elements.

Although not wishing to be bound by any particular theory with respect to the surprising improved performance of this type of flame arresting device, it is thought that with the prior art devices the hydraulic diameter of the channels required to effect extinction of detonation flames and types of deflagration flames promoted laminar flow of the flame front through the channels. This laminar flow develops a boundary layer of gas turbulence which significantly increases resistance of heat transfer from the flame front to the metal elements thereby requiring either increase in surface area to effect flame extinction or a several fold increase in length extension of the laminar flow channels. Contrary to that system, the turbulence inducing devices of this invention minimize boundary layer thickness in the advancing flame front within the channels so that increased heat transfer is realized and quite surprisingly to an extent which does not require any additional devices such as detonation attenuators in the unit to effect quenching of high pressure detonation flame fronts.

In view of this enhanced performance of the flame extinguishing elements used in the flame arrestor of this invention, the device can be designed with channels having hydraulic diameters which provide for more than acceptable flow and pressure drop characteristics despite their enhanced performance. This permits the designing of the straight path section of the flame arrestor elements with acceptable channel hydraulic diameters which avoids clogging and also facilitates cleaning as required. This type of element is easy to construct in a form which is capable of withstanding repeated high pressure impacts of supersonic shock waves associated with detonation wave or flame fronts. It is also understood that the apparatus for extinguishing flames in accordance with this invention may be used with a variety of flammable gaseous mixtures. The most common applications involve the typical alkane hydrocarbon vapour mixture with air, for example, methane, propane, and ethane. The invention also applies to combustible gases that are more difficult to extinguish such as ethylene, acetylene, hydrogen, hydrogen sulfide, and the like. The apparatus may also be used in applications for arresting flames that include pure oxygen or oxygen enriched air which can withstand high pressure detonation flame fronts associated with such combustible mixtures. Tests have been conducted to demonstrate the superior performance of the flame arresting apparatus according to this invention. A standard test unit was used to determine pass or fail of various flame arrestor designs. The test unit is constructed in accordance with standard flame arrestor testing techniques which is briefly described as follows.

The flame arrestor test system is made up of three sections: the run-up side, the test flame arrestor, and the protected side. Although the unit is briefly described here, it can be found in several reference texts and, in particular, the new guidelines for the unit can be found in greater detail in Canadian Standards Associated standard 2343 (revised edition to be published March 1993). The run-up section consists of 40 feet of 3-inch steel pipe. Spark plugs are installed at 1-foot intervals along the entire length in order to permit variation of the conditions of flame arrival at the flame arrestor face. In general, the arrival pressure increases with increasing distance of ignition from the arrestor. At the end furthest from the arrestor, there is a three-foot-long flame accelerator to allow the generation of detonations within the limited test run-up length. A pressure transducer is located about 6 inches from the arrestor inlet flange in order to monitor the flame arrival pressure. Also, a flame verification thermocouple is at the same distance relative to the inlet flange.

On the protected side, two different explosion venting conditions can be tested: open end and restricted end. The open end pipe is 10 feet long while the restricted end pipe is two feet long with a one-half inch diameter by 6-inch long vent nipple attached to the end. A flame detection thermocouple is installed on the protected side in order to monitor flame arrestor failure. As well, a pressure transducer is used to monitor pressures on the protected side. The test procedure consists of purging the test system with a 4.2% propane-air mixture, ignition, and assessment of flame arrestor performance.

In the aforementioned U.S. Pat. No. 4,909,730 a test system similar to that described above was used in testing the flame arrestors which included various types of element designs as well as the use of a detonation attenuator cup. Of the various designs tested it is interesting to note the results of tests on the element design of FIG. 16 of that U.S. patent. That design consists of a plurality of individual elements stacked together without the use of an attenuator cup. The channel hydraulic diameter was approximately 0.04 inches which involved the use of a 0.05-inch crimped height for the element channels. The conclusion in testing that unit was that, for detonation flame fronts, it failed.

In order to test the advantages and unexpected features of this invention it is apparent that in the prior art devices the detonation attenuator cup is required to provide a useful unit. We have therefore compared the performance of a flame arrestor design having the extinguishing elements 60, 62, 64, and 66 without the turbulence inducing devices positioned therebetween and instead with the prior art detonation attenuator cup positioned in front of the elements in accordance with the design configuration of FIG. 3 of that U.S. patent. The hydraulic diameter of the channels in the elements of the test unit having the attenuator cup without the turbulence inducing devices was the same as the hydraulic diameter of the channels in the elements of the design in accordance with this invention. The flame arrestor elements had the following characteristics:

1) the crimped height of the channel was 0.070 inches,
2) each element was approximately 2 inches thick,
3) each element had a diameter of 9.5 inches,
4) the hydraulic diameter of the channels was 0.055 inches which is 38% greater than the hydraulic diameter of 0.04 inches for the elements of the aforementioned U.S. Pat. No. 4,909,730, and
5) the metal foil in the crimped metal element has a thickness in the range of 0.01 inches.

Based on the above test conditions and design criteria the results are set out in Table 1 where column A is the Run-up Distance to the attenuator, that is, the distance of ignition of the gas in front of the arrestor. Columns B and C relate to the prior art device having the detonation attenuator cup and Columns D and E relate to the subject invention. In columns B and D the pressure upstream of the attenuator is measured by the pressure transducer and given in PSIG.

In all situations of advancing flame type, whether it be low pressure deflagration or high pressure detonation, the device of FIG. 4 performed extremely well and passed in each instance, whereas the flame arresting device common to the prior art failed on several occasions.

The prior art system used a channel hydraulic diameter of 0.04 inches. The flame arrestor according to this invention performed successfully even though the hydraulic diameter of the crimp channels was increased to 0.055 inches (38% greater) and a 90% increase in channel hydraulic area. As a result, the subject invention permits the flame arrestor to perform successfully with significantly greater channel hydraulic diameter. This design reduces clogging of the elements and reduces the pressure drop of the crimped ribbon elements by about 30%. As previously noted, equivalent relative benefits can be realized for flame arrestor applications with smaller hydraulic diameters for use with systems involving more flammable gases such as acetylene, hydrogen, ethylene, hydrogen sulphide, and the like. For such very flammable gases, the hydraulic diameter may be as low as 0.005 inches which is still larger than what would be required in prior art devices. It is also understood that in some applications with less flammable gases, the hydraulic diameter may be greater than 0.05 inches up to approximately 0.10 inches.

This invention provides a more readily constructed apparatus for extinguishing travelling flames with a minimum number of components yet covers most applications and can withstand repeated high pressure detonations.

Although preferred embodiments of the invention are described herein in detail, it will be understood by those skilled in the art that variations may be made thereto without departing from the spirit of the invention or the scope of the appended claims.

We claim:

1. An apparatus for extinguishing a flame travelling along a pipe where the flame is characterized as a deflagration flame or a detonation flame, said apparatus comprising:
   i) a housing with an inlet and an outlet and means for connecting said inlet and said outlet to said pipe,
   ii) a flame extinguishing device,
   iii) means for securing said device in said housing,
   iv) said device including a plurality of serially arranged elements, each element having a plurality of longitudinally extending channels,
   v) means for inducing turbulence in a flow of the flame through said elements, said turbulence inducing means being positioned between adjacent elements of said elements, said turbulence inducing means having a plurality of surfaces for obstructing direct flame flow exiting from each and every one of said plurality of channels of one of each said adjacent elements to induce turbulent flow in the flame entering each and every one of said plurality of channels of another of each said adjacent elements, said surfaces inducing such turbulent flow in the flame entering said plurality of channels of said other adjacent element enhancing thereby heat transfer from the flame into said other adjacent element, respectively,
   vi) said device having a sufficient number of said elements to extinguish the flame travelling along said pipe in which said apparatus is connected, and
   vii) means for sealing said elements to said housing to direct said flame flow solely through said elements and said turbulence inducing means.

2. An apparatus of claim 1 wherein said turbulence inducing means is a rigid component abutting each said adjacent elements to space apart said adjacent elements, said component having a thickness which is less than 10% of a longitudinal length dimension of one of said elements.

3. An apparatus of claim 1 wherein said surfaces comprise a plurality of angled vanes.

4. An apparatus of claim 1 wherein said surfaces comprise a perforated plate.

5. An apparatus of claim 1 wherein said surfaces comprise a wire mesh.

6. An apparatus of claims 3, 4 or 5 wherein said elements is formed of crimped ribbon metal wrapped about a core in a manner to define said longitudinally extending channels having hydraulic diameters which effect flame extinction.

7. An apparatus of claims 3, 4 or 5 wherein said elements are formed by parallel plates to define said longitudinally extending channels having hydraulic widths which effect flame extinction.

8. An apparatus of claims 3, 4 or 5 wherein said elements are formed by a bundle of parallel extending tubes, each tube having a hydraulic diameter which effects flame extinction.

9. An apparatus of claims 3, 4 or 5 wherein said elements are formed by a grid of intersecting plates to define said channels which are rectangular in cross section and have a hydraulic cross-sectional dimension which effects flame extinction.

10. An apparatus of claims 3, 4 or 5 wherein said longitudinally extending channels of said elements have an effective hydraulic diameter which is in a range of 0.005 inches to 0.10 inches.

11. An apparatus of claim 3 wherein each said element is formed of crimped ribbon metal wrapped about a core in a manner to define said longitudinally extending channels having hydraulic diameters which effect flame extinction, said vanes being defined by an expanded metal sheet, said elements and said turbulence inducing means being circular and having equivalent diameters, and said sealing means comprises a sleeve enveloping and contacting outer circumferential portions of said elements to direct thereby all said flame flow from said inlet through said elements.

12. An apparatus of claim 11 wherein said securing means comprises a first support grid fixed against one of said elements at said inlet and a second support grid fixed against another of said elements at said outlet, said housing having means at said inlet and said outlet for wedging said support grids against said respective elements.

TABLE 1

| | A | B | C | D | E |
|---|---|---|---|---|---|
| | | PRIOR ART | | SUBJECT INVENTION | |
| | Runup Distance ft. | Pressure (PSIG) | Pass/Fail | Pressure (PSIG) | Pass/Fail |
| 1 | 1 | 6.7 | Fail | 2 | Pass |
| 2 | 1 | 3.3 | Fail | 3 | Pass |
| 3 | 1 | 15 | Fail | 5.3 | Pass |
| 4 | 2 | 0.9 | Pass | 6 | Pass |
| 5 | 4 | 5 | Pass | 7.8 | Pass |
| 6 | 4 | 6.7 | Pass | 6 | Pass |
| 7 | 10 | 5 | Pass | 6 | Pass |
| 8 | 18 | 26 | Pass | 20 | Pass |
| 9 | 18 | 26.3 | Pass | 15 | Pass |
| 10 | 23 | 350 | Fail | 75 | Pass |
| 11 | 23 | 90 | Pass | 20 | Pass |
| 12 | 24 | 70 | Pass | 900 | Pass |
| 13 | 24 | 50 | Pass | 806 | Pass |
| 14 | 25 | 1129 | Fail | 250 | Pass |
| 15 | 25 | 1200 | Fail | 1000 | Pass |
| 16 | 25 | 725 | Fail | 900 | Pass |
| 17 | 25 | 2000 | Fail | 800 | Pass |
| 18 | 29 | 2000 | Fail | 500 | Pass |

\* \* \* \* \*

UNITED STATES PATENT AND TRADEMARK OFFICE
CERTIFICATE OF CORRECTION

PATENT NO. : 5,415,233
DATED : May 16, 1995
INVENTOR(S) : Roussakis et al.

It is certified that error appears in the above-indentified patent and that said Letters Patent is hereby corrected as shown below:

On the title page, under [73] Assignee, the assignee, "Chem-Mech" should be --Chem-Mech Engineering Laboratories--.

Signed and Sealed this

Thirty-first Day of October 1995

Attest:

BRUCE LEHMAN

*Attesting Officer*     *Commissioner of Patents and Trademarks*